United States Patent [19]

Elias et al.

[11] E Re. 29,751

[45] Reissued Sep. 5, 1978

[54] MEANS FOR FILING DOCUMENTS

[76] Inventors: Abram G. Elias, 3300 Skyline Blvd., No. 205, Reno, Nev. 89510; Peter G. Elias, 6 Wedgewood Dr., Winnipeg, Manitoba, Canada, R3T 2J8

[21] Appl. No.: 735,100

[22] Filed: Oct. 26, 1976

Related U.S. Patent Documents

Reissue of:

[64] Patent No.: 3,850,488
Issued: Nov. 26, 1974
Appl. No.: 327,743
Filed: Jan. 29, 1973

U.S. Applications:

[63] Continuation-in-part of Ser. No. 238,040, Mar. 27, 1972, abandoned.

[51] Int. Cl.[2] ..... A47B 63/00
[52] U.S. Cl. ..... 312/184; 211/45
[58] Field of Search ..... 312/184, 187; 211/45, 211/46, 162, 184; 402/4, 38

[56] References Cited

U.S. PATENT DOCUMENTS

| | | | |
|---|---|---|---|
| 2,749,915 | 6/1956 | Hatch | 211/46 |
| 2,935,204 | 5/1960 | Jonas et al. | 211/46 |
| 3,249,111 | 5/1966 | Vincens | 211/46 |
| 3,298,374 | 1/1967 | Grundell | 211/46 |
| 3,318,354 | 5/1967 | Borisof | 150/40 |
| 3,530,543 | 9/1970 | Desmarais et al. | 24/16 PB |
| 3,630,387 | 12/1971 | Wehner | 211/46 |
| 3,684,340 | 8/1972 | Kirkorian | 312/184 |

FOREIGN PATENT DOCUMENTS

| | | | |
|---|---|---|---|
| 731,238 | 10/1932 | France | 312/184 |
| 1,024,781 | 4/1953 | France | 312/184 |
| 6,706,044 | 10/1967 | Netherlands | 312/184 |
| 349,954 | 12/1961 | Switzerland | 312/184 |
| 655,910 | 8/1951 | United Kingdom | 312/184 |
| 890,810 | 3/1962 | United Kingdom | 312/184 |
| 1,087,888 | 10/1967 | United Kingdom | 312/184 |

*Primary Examiner*—Casmir A. Nunberg
*Assistant Examiner*—Alex Grosz
*Attorney, Agent, or Firm*—O'Brien and Marks

[57] ABSTRACT

[A means for filing documents which is particularly adapted for open filing of various file folders, as for example legal size file folders, and wherein the folders are suspended on horizontal rails and freely slidable longitudinally of the rails, the files suspended below the rails being closely adjacent lower surfaces of a plurality of superimposed files and bars support the file folders on the rails slidably longitudinally thereof, the bars being provided with notches or bearings in their lower edges near their opposite ends so that the file folders, together with the bar, may be placed into a position between superimposed files, as for example, by placing one end of the bar underneath a first rail and then lifting the bar up at its far end and lowering it onto a second rail to engage a respective notch with the rail. The holder may then be pushed back together with the bar and the front end of the bar is raised up behind the first rail and pulled forward and placed over the upper portion of the rail so that the respective notch is engaged with the first rail at the outer side of the open filing system to suspendingly support the file holder and allow it to be slidably moved longitudinally along the rails as desired. The reverse procedure may be taken to remove a file holder and its supporting bar from the filing means of the invention, thus allowing a plurality of superimposed shelves to be utilized under which a pair of rails of the invention support a plurality of file or folder supporting bars, all readily movably mounted on the rails.]

[Further, the disclosure relates to an important modification of the invention having reinforced bar structure and novel document connection means especially adapted for holding large documents and groups thereof, such as maps, blueprints, or other large documents which may be suspended on a pair of rails in a similar manner to that hereinbefore described.]

*A means for filing documents, such as maps, blueprints, legal files, etc., includes a horizontal supporting bar supported at opposite ends on spaced horizontal rails wherein the bar has a strip-like structure with an upper supporting portion formed concavo-convex in vertical cross-section throughout its length for nesting with adjacent supporting bars, and rail engaging notches near opposite ends of the*

*bar with the notches being relatively long and the inner edges of the notches being spaced apart sufficiently less than the spacing between the rails so that one end of the bar can be moved freely between the rails inside of its respective rail while the other end of the bar is engaged by its rail within its notch. For smaller documents such as legal files, the bars support file folders for holding the files; such arrangement of rails, bars and file folders can be superimposed with similar arrangements or can have closely superimposed shelves. Further there is disclosed a plurality of flexible straps with head portions interlocking in spaced openings in each bar for supporting larger documents.*

13 Claims, 17 Drawing Figures

MEANS FOR FILING DOCUMENTS

Matter enclosed in heavy brackets [ ] appears in the original patent but forms no part of this reissue specification; matter printed in italics indicates the additions made by reissue.

CROSS-REFERENCE TO RELATED APPLICATION

This application is a *reissue application of U.S. Pat. No. 3,850,488 which issued Nov. 26, 1974 upon application Ser. No. 327,743 filed Jan. 29, 1973 which was a* continuation-in part of our copending application for means for filing documents, Ser. No. 238,040, filed Mar. 27, 1972 now abandoned.

BACKGROUND OF THE INVENTION

Various file folder supports of the prior art have utilized rails and folders suspended therefrom; however, such prior art devices have not been readily adapted for use in combination with open shelf filing cabinets, particularly due to the fact that most folder supporting rails and bars are so constructed that it is necessary to move the file folders and bars directly upward to a position above the supporting rails in order to remove the respective file folder from the file.

Due to the economy of open shelf filing systems and due to the desirability thereof with respect to office space, there has been an economic trend toward open shelf filing. Most conventional open shelf filing systems have therefore been provided with superimposed shelves and file folders are merely stacked side by side and tend to fall over or lean against each other without proper means for suspending them. Additionally the proper filing of large documents such as groups of blueprints and maps have posed a problem since most of these documents have been placed in large drawers wherein the sheets are laid flat or such documents have been stored in cubby-holes in a generally rolled condition. Various other inconvenient means and methods have been used to support such large documents, as for example clamps and hooks have been used to hange these large documents; however, such means and methods have been inconvenient and relatively inefficient.

*More specifically, rail supported hangers with clamping devices for large documents are disclosed in U.S. Pat. No. 2,869,210 and Great Britain Pat. No. 655,910 the latter disclosing a hanger with a pair of clamping rails formed with mating zig zag vertical profiles to securely grip an upper edge of a plan, drawing or map therebetween. In U.S. Pat. No. 3,298,374 and Netherlands Pat. No. 6,706,044 there are disclosed hangers with opposite hinged portions extending on opposite sides of a document or group of documents with tongues or prongs from one portion extending through holes in the documents; the Netherlands patent showing a head on a prong interlocking with a horizontal slot in the opposite portion. U.S. Pat. No. 3,684,340 and France Pat. No. 731,238 disclose hangers for documents with lower planar portions having holes therein together with binding posts through the holes in the hanger and holes in a document, or folding fasteners extending through the holes in the hanger and holes in a document, to secure the documents to the hanger. These types of hanger arrangements have several deficiencies such as failing to occupy the minimum amount of space, being relatively more difficult to attach documents thereto, not offering adequate vertical and horizontal strength, or being relatively more expensive.*

*In suspended file folder systems, U.S. Pat. No. 2,935,204 shows the removal of a pair of supporting bars and attached folder by moving the bars and folder toward the rear, tipping the front ends of the bars below a front rail, and then moving the bar and folder beneath the front rail from the filing system; however such bars must be lifted at both ends to disengage notches in such ends from respective front and back rails prior to moving the bar and folder toward the rear; the lifting of the rear end can be difficult when the bar and folder can only be gripped at the front and the folder contains heavy documents. A stiffening rib or flange formed by a folded back upper edge of a supporting bar is illustrated in U.S. Pat. No. 2,749,915; such folded back edges increase the thickness of the supporting bars to more than twice the sheet material of which there are formed and thus take up extra space lessening the number of hangers per unit of horizontal space. The securement of edge portions of folders by strips integral with one half of the folder extending through horizontal slots in the opposite half of the folder is disclosed in Great Britain Pat. No. 890,810.*

*The prior art also contains various fastening devices which have little if any relevance to arrangements for hanging documents on rails; such fastening devices include U.S. Pat. No. 3,318,354 which illustrates a key secured by a strip including a head having opposite shoulders interlocking with opposite sides of an opening having a vertical slot portion, and U.S. Pat. No. 3,765,110 which discloses a plastic filament with end bars joined in a T-arrangement therewith to attach a tag to merchandise.*

SUMMARY OF THE INVENTION

The present invention comprises a novel combination of means in a filing means for holding documents, the combination including [superimposed files and folder supporting rails spaced directly below each superimposed group of files, and] bars having notches in lower end portions thereof engaged with the rails for suspendingly supporting *the documents or* file folders, and the notches in the lower edges of the bars which support the file folders are elongated so as to provide for removal of the bars and the respective file folders by raising the outermost ends of the bars above the respective rail at the front of the filing system, then sliding the bars backwardly until the outer ends of the bars clear the rail at the front of the filing system, then the outer ends of the bars are lowered and removed below the outermost rail as the rearward ends of the rail are lifted upwardly slightly to disengage the notches therein from the rearward rail and thus a file folder may readily be removed from open filing means of the invention without raising the file folder or supporting bar structure upward a substantial distance above the rails, and to thereby allow a superimposed group of files to be placed directly above the rails in close proximity thereto and to afford a plurality of superimposed groups of files between which file folders may be slidingly and suspendingly supported, and very conveniently removable and replaceable onto the rails.

Additionally, the invention comprises novel construction of the aforementioned bars wherein a [pliable] *strip-like* document holding structure is reinforced [by a reinforcing member] in a horizontal load carrying structure of the bar, and [wherein the reinforcing member may be substantially rigid relative to the relatively pliable document supporting structure of the bar, and] wherein the reinforcing portion of the bar is relatively concavo-convex in order to provide substantial structural strength as well as to nest with adjacent like portions of a plurality of such bars in order to provide compact horizontal relationship of the bars and the document holding structure in connection therewith.

*Further an arrangement for hanging a document on rails contemplates a bar with a document holding structure having a plurality of openings spaced between rail engaging ends of the bar together with a plurality of flexible straps adapted to secure the document and having heads for interlocking in the openings of the bar.*

[The] *Still further the* document holding structure of the bars [being] *is* made of pliable material and [having] *has* punched out document holding elongated straps having enlarged head portions which may be lockingly connected in slots from which the straps are punched out, to thereby provide a bayonet locking arrangement and whereby an intermediate portion of each strap extends through an opening in a large document such as a large blueprint or a group thereof, or through maps or other large documents, as desired.

Accordingly, it is an object of the present invention to provide a novel rail and supporting bar structure which is adapted for use in open shelf filing system for filing small documents such as legal file folders may contain, and further the invention is adapted for use in supporting relatively large documents such as blueprints and maps or the like, either in small numbers or in groups, as desired.

Another object of the invention is to provide a shelf, rail and bar mechanism for removably supporting file folders in an open filing system to provide the utmost convenience in removing and replacing files from rails in close proximity to the underside of superimposed groups of files.

Another object of the invention is to provide a novel bar construction which is adapted to suspend documents on a pair of spaced apart rails, said novel construction comprising an extrusion of pliable material having a generally channel shaped cross section wherein a reinforcing member of relatively [high] *rigid* material is readily slidably positionable therein by sliding the reinforcing member longitudinally in the generally channel shaped structure of the pliable member, all of which affords simplicity of construction, economy of manufacture, and structural rigidity of the bar for holding substantial loads such as may be imposed by groups of large documents such as blueprints and maps or the like.

Other objects and advantages of the invention may be apparent from the following specification, appended claims and accompanying drawings.

BRIEF DESCRIPTION OF THE DRAWINGS

FIG. 1 is a fragmentary perspective view showing a pair of rails together with a bar structure of the invention removably supported on the rails and suspending a group of large documents such as blueprints, maps or the like;

FIG. 10 is a perspective view of the rails and a pair of folder supporting bars of the invention carrying a substantially open folder adapted to contain legal size files or the like;

DESCRIPTION OF THE PREFERRED EMBODIMENTS

Figure 1:
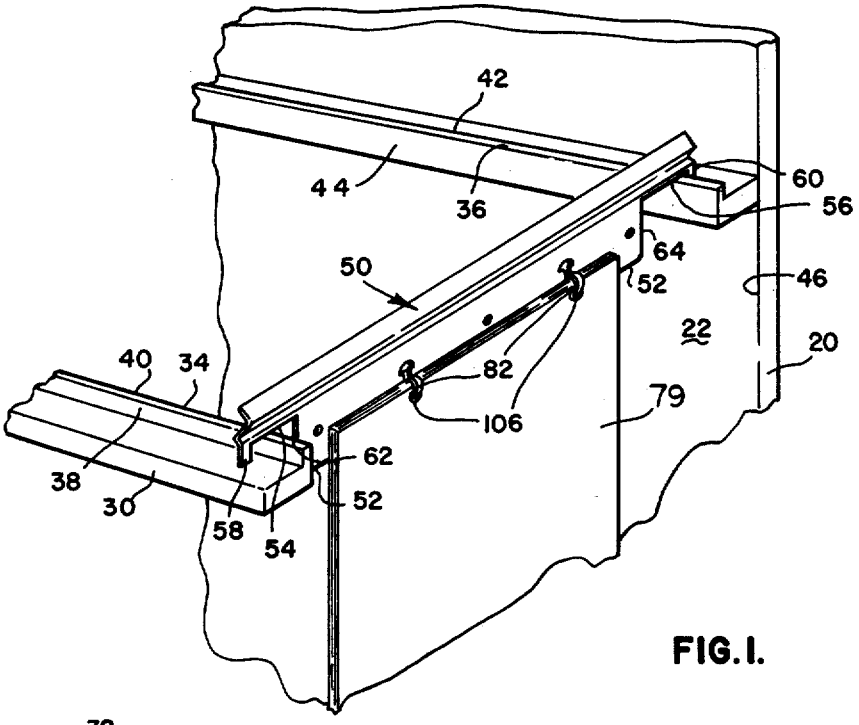
Figure 2:
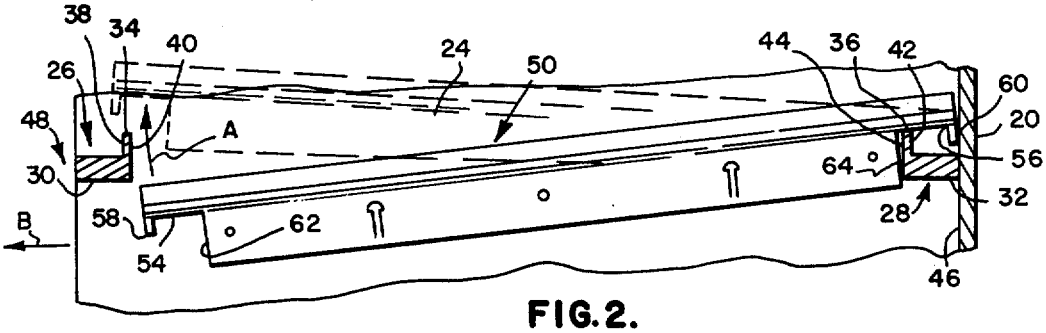
FIG. 2 is fragmentary cross sectional view of the structure shown in FIG. 1, and showing a manner in which the document supporting bar of the invention may be removed or replaced relative to the bar supporting rails of the invention.
Figure 3:
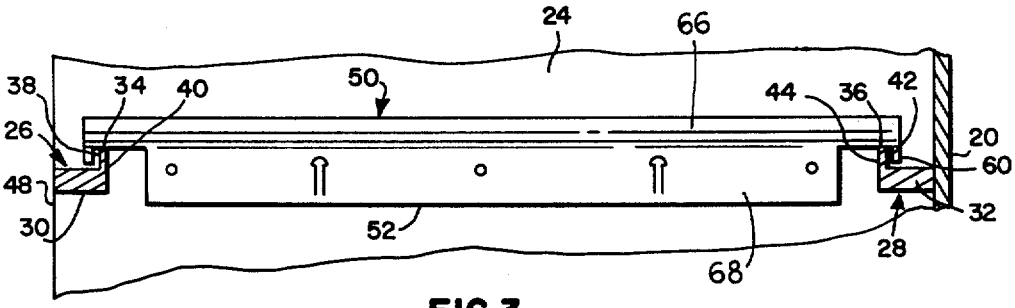
FIG. 3 is a view similar to FIG. 2 but showing the document supporting bar of the invention fully engaged with the bar supporting rails and related to an element of a cabinet structure.

As shown in FIGS. 1, 2 and 3 of the drawings, the filing means of the invention is provided with a frame 20 which may include a cabinet having a back wall 22 with end walls such as the wall 24 shown in FIGS. 2 and 3 of the drawings. Thus the frame of the invention may comprise a back wall 22 and a pair of spaced apart end walls 24 which support first and second *horizontally spaced-apart* rails 26 and 28. These rails 26 and 28 are provided with basic load carrying structures 30 and 32, respectively, and are provided with rail portions 34 and 36, respectively. The rail portion 34 is provided with an outer side 38 and an inner side 40 while the rail portion 36 is provided with an outer side 42 and an inner side 44; *the inner sides 40 and 44 facing each other.* Opposite ends of the rail structure 26 and 28 may be supported between end walls of the box-shaped frame such as between a pair of spaced apart end walls 24, while the rail 28 is disposed adjacent an inner side 46 at the rear of the frame 20 which is generally a box-shaped cabinet having an open front 48 as shown in FIGS. 2 and 3, and this front 48 may be enclosed by suitable sliding or other doors, if desired.

A *horizontally elongated strip-like* document supporting bar 50, as shown in FIGS. 1, 2 and 3, is provided with a normally lower edge [portion] 52 [having] *and* notches 54 and 56 therein which are recessed upwardly above *the lower edge 52 proximate the opposite end edges of the bar 50 but leaving* first and second *downward extending stop-portions or* ends 58 and 60 of the bar 50 *forming the outer boundaries of the notches 54 and 56.* It will be seen that the first and second [notch portions] *notches* 54 and 56 are of a length extending longitudinally along the bar 50 which is substantially greater than the width of each of the rails between the inner and outer sides thereof, as for example the rail portion 34 is quite narrow between its outer side 38 and inner side 40, and the notch 54 is substantially longer longitudinally along the bar 50 than the overall thickness or width of the rail portion 34, and this relationship also exists with respect to the notch 56 and the rail 36 so that the bar 50 may be slidably moved with the notch 56 engaging the rail 36 such that the end 58 may clear the inner side 40 of the rail 34 and be moved upwardly in accordance with an arrow A in FIG. 2 of the drawings to a position above the rail 34, whereupon the bar 50 may be moved in the direction of the rail 34 thereabove and lowered thereonto, into the position as shown in FIG. 3 of the drawings. It will be noted that the rail 36 is spaced from the inner side 46 of the back wall 22 a distance substantially greater than the length of the notch 56 so as to permit clearance of the end 60 of the bar 50 when moved to the position shown in FIG. 2.

End [portions] *edges or boundaries* 62 and 64, respectively, of *opposite ends of a lower generally planar portion of the bar 50 between* the notches 54 and 56 are adapted to extend downwardly between the respective rail portions 34 and 36 adjacent the inner sides 40 and 44, respectively, thereof, and the ends 58 and 60 of the bar 50 are disposed to engage the outer sides 38 and 42 of the rail portions 34 and 36, respectively, to limit longitudinal movement of the bar 50 on the rails so as to prevent longitudinal displacement thereof when the bars 50 are moved longitudinally of the rail portions 34 and 36. *The length between the edge 64 and the end edge of the bar 50 at the end 58 is less than the space or distance between the inner sides 40 and 44 of the rails to permit the free movement of the end 58 past the inner side 40 of the rail 34 while the rail 42 is engaged in the notch 56; similarly the length between the edge 62 and the end edge of the bar 50 at the end 60 is less than the space between the rails 34 and 36.*

As shown in FIGS. 2 and 3 of the drawings, it will be seen that the [rail] *bar* 50 disclosed in FIG. 1 at its end 58 may be removed from the rail portion 34 and tilted downwardly to the position shown in FIG. 2 whereupon the end portion 60 may be raised slightly to clear the rail 36 and the bar 50, together with documents [66, and] *79*, may be removed from a position below the rail 30 in the direction of the arrow B, as shown in FIG. 2 of the drawings.

When replacing the bar 50 relative to the rails 30 and 32, the reverse procedure is followed such as to first place the end 60 of the bar 50 below the rail 30 and move it oppositely relative to the arrow B to a position wherein the end 60 is above the rail portion 36, whereupon it may be lowered into the position as shown in FIG. 2. Then the end 58 of the bar is moved upwardly in the direction of the arrow A to a position above the rail portion 34 and then moved in the direction of the arrow B until the end 58 is disposed beyond the outer side 38 of the rail portion 34. The bar 50 may then be lowered to the position as shown in FIG. 3 wherein it suspendingly supports documents [66] *79* therefrom. Such documents may be heavy blueprints or maps, or groups thereof, as desired.

The procedure for engaging the bar with the rails, as hereinbefore described, applies to the species of the invention as shown in FIGS. 9 to 14, as will be hereinafter described in detail.

Figure 4:
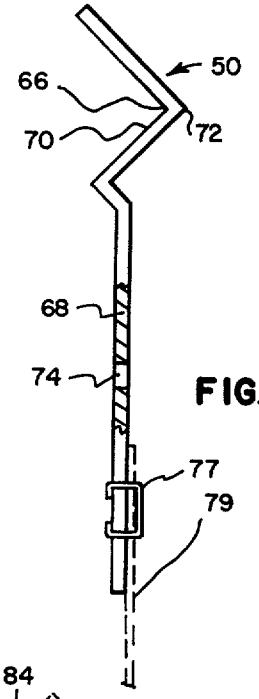
FIG. 4 is an end view of a document supporting bar of the invention.
Figure 8:
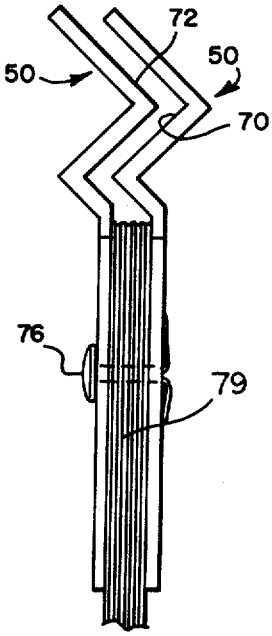
FIG. 8 is an end view of a pair of document supporting bars such as shown in FIGS. 4, 5 and 6 of the drawings with a plurality of large documents, such as blueprints, maps, or the like, secured therebetween by conventional staple type clips extending through the bars and through the openings in the respective documents held between the bars.

The *vertical* cross sectional shape of the bar 50, as shown in FIG. 4, comprises a *upper* load carrying *portion or* structure 66 and a *lower* document supporting *or carrying portion or* structure 68. *The width of the strip-like bar extends in the vertical direction.* The load carrying structure is integral with the document supporting structure 68, as shown in FIG. 4, and this load carrying structure 66 is generally concavo-convex, having a concave side 70 and a convex side 72 *throughout the length of the structure 66.* It will be seen that the cross section may be angular or curved, as desired, however, this structure is so arranged to provide stiffness in both vertical and lateral directions in order to support heavy documents in connection with the document supporting portion 68. This portion 68 is provided with holes 74 therein, through which a clip or staple 76, as shown in FIG. 8 may be inserted. Alternatively, a staple 77 may be machine installed through the document supporting structure 68 to hold a document, as indicated by broken lines 79, in suspended relation to the bar 50.

As shown in FIG. 8, it will be seen that a plurality of the bars 50 may be utilized at opposite sides of a large group of blueprints or maps [66] *79* with the staple 76 extending through the holes 74 and in this manner a pair of the concavo-convex structures 66 may be nested wherein the convex portion 72 of one bar 50 is *mated or* nested with the generally concave portion 70 of the adjacent bar, thus providing for horizontal compactness in the filing of the documents in connection with the bars, and also providing lateral stiffness of the bars both as to vertical deflection and horizontal deflection.

Figure 5:
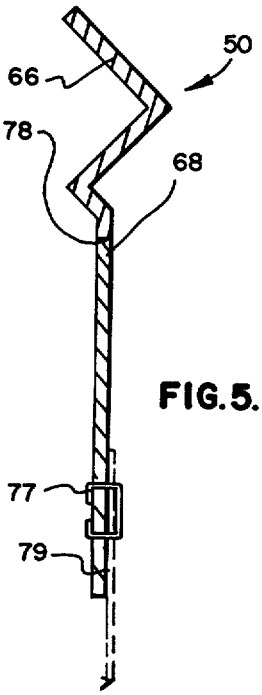
FIG. 5 is a cross sectional view similar to FIG. 4 but showing the document supporting bar of the invention made of two different materials to provide for structural strength as well as pliability of the document supporting portion of the bar.

In the modified bar 50, as shown in FIG. 5 of the drawings, the load carrying structure 66 is preferably made of a relatively hard material such as hard plastic, extruded aluminum, or the like, and a *generally planar* lower portion constituting the document supporting portion 68 may be made of a relatively soft pliable material, and these relatively hard and soft materials may be integral with each other or bonded together at a transition 78, all as shown best in FIG. 5 of the drawings.

The pliable portion 68 may have the same characteristics as a pliable document supporting portion 80 of the structure shown in FIG. 6, wherein *flexible* document supporting *fasteners or* straps 82 *with head portions or segments 96 interlocking with enclosed openings 108 in the supporting portion 80* are utilized for supporting the documents [66] *79*, all as will be hereinafter described.

Figure 6:
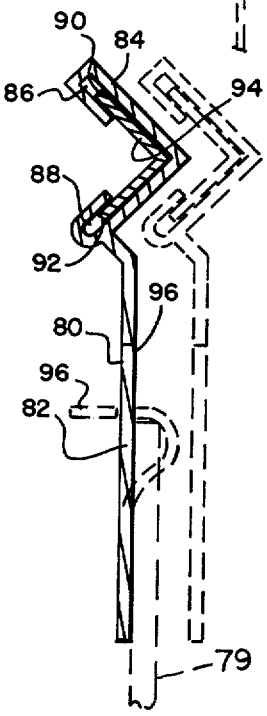
FIG. 6 is a cross sectional view of another structural arrangement of the document supporting bar of the invention showing a reinforcing member held partially encapsulated in a channel shaped in cross section portion of a pliable document supporting bar structure.
Figure 7:
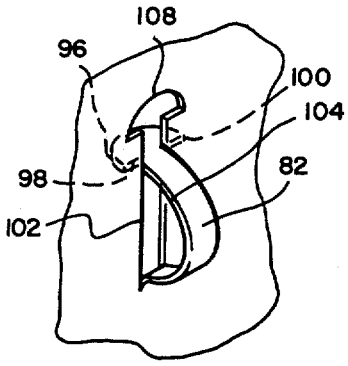
FIG. 7 is a fragmentary perspective view of a portion of the document supporting part of the bar shown in FIG. 6 of the drawings, the strap shown in FIG. 7 being adapted to extend through holes in large documents for connecting them to the document supporting bar of the invention.

Accordingly, it will be understood that the flexible portion 68 of the bar 50, as shown in FIG. 5 of the drawings, may contain the straps 82 as shown in FIGS. 6 and 7.

As shown in FIG. 6, the pliable *planar* document supporting portion 80 is [provided with] *integrally affixed or joined at its upper boundary with a lower boundary of a central segment of* a generally concavo-convex channel structure 84 forming a part of the load carrying structure of the invention. This portion 84 is provided with channel portions 86 and 88 which retain generally upper and lower edges 90 and 92 of a metallic reinforcing member 94, It will therefore be appreciated that the portions 80 and 84 may be extruded of soft pliable material such as plastic, and the reinforcing member 94 may be made of sheet metal or the like.

Punched out of the document supporting portion 80 is a plurality of the straps 82, hereinbefore described. Each strap 82 is *elongated and* provided *at one end* with an enlarged head portion 96 having oppositely directed *horizontal abutments or* edges 98 and 100 which [overlie] *interlock with* respective opposite edges 102 and 104 of a *lower elongated vertical* slot *portion of the opening 108* from which the strap 82 is punched out. *At the other end, each strap 82 is integral with or remains unsevered from the portion 80.*

Inasmuch as the strap is pliable, it may be inserted through openings in blueprints [66] *79*, these openings being designated 106 in FIG. 1 of the drawings. The straps 82, when inserted through the openings 106, may then be inserted through the *enclosed openings or* slot portion 108 from which the head portion 96 is stamped and the opposite portions 98 and 100 [overlie] *engage* the opposite edges 102 and 104 of the slot, thereby captivating the strap 82 in a loop shaped arrangement as it extends through the openings 106 of the document [66] *79*, all as shown best in FIGS. 1, 6 and 7 of the drawings. Thus, heavy documents and large, long documents such as blueprints, maps, or the like, may be held either singly or in groups on the bar 50 of the invention as shown in FIGS. 1 to 8 of the drawings.

In the [specie] *species* of the invention as shown in FIGS. 9 to 14 of the drawings, a plurality of superimposed shelves 110 may be vertically superimposed in spaced apart relationship and these shelves 110 are located in generally horizontal relationship to each other. Below each shelf are rails, in pairs, similar to that as disclosed in FIG. 1 of the drawings. These rails are designated 112 and 114 in FIGS. 9 to 12 inclusive. Opposite ends of the rails 112 are supported on clips 116 in connection with vertical members 118 of the open shelf structure shown in FIG. 9 of the drawings.

Figure 11:
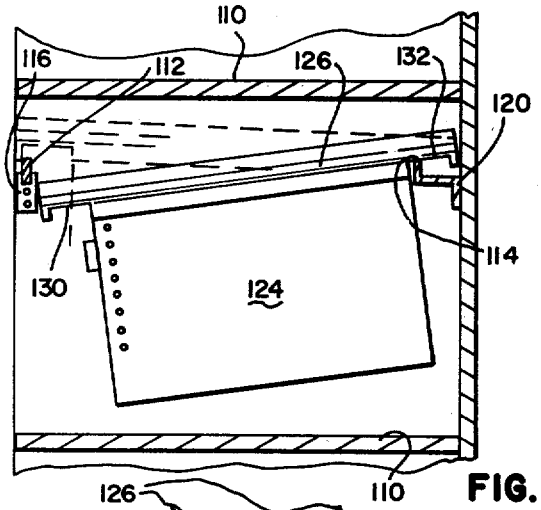
FIG. 11 is a cross sectional view of the filing means and open shelves shown in FIG. 9 of the drawings, and illustrating the manner in which the folder supporting bars may be moved longitudinally out of engagement with the front rail of the invention and slideably moved forward and outward to carry file folders out of the space between the shelves without having to remove the files upward to clear the file holders and bars from the rails which are in close proximity to the lower sides of the respective shelves.
Figure 12:
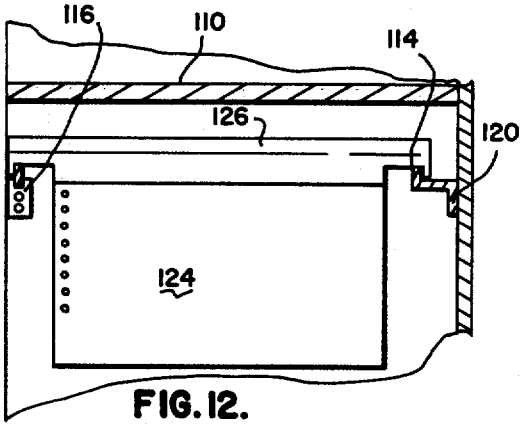
FIG. 12 is a cross sectional view similar to FIG. 11 but showing the bars and folders of the invention fully engaged with the rails of the open shelf filing system so that the bars and folders may be slidably moved longitudinally of the rails to accommodate disposition of adjacent folders.
Figure 13:
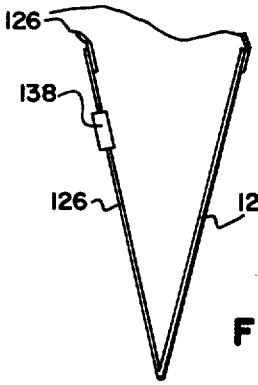
FIG. 13 is an end view of one of the folder and bar assemblies of the invention, such as shown in perspective in FIG. 10 of the drawings.

The rail 114 is provided with a bracket portion 120 which is secured to the inner side of a wall structure 122 of the open shelf means at the rear edges of the shelf structures 110, as shown best in FIGS. 11 and 12 of the drawings.

Figure 9:
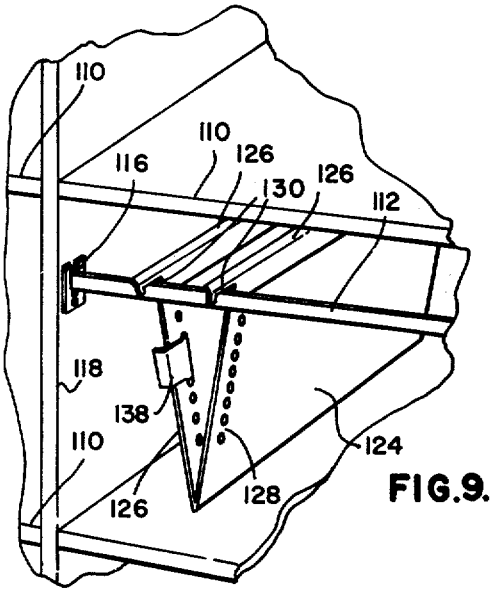
FIG. 9 is a perspective view of the filing means for holding documents of the invention, adapted for open shelf filing of documents such as legal size folders or the like, and wherein a plurality of superimposed shelves are disposed having rails and bars of the invention directly below the shelves such that the folders must be removed downwardly and outwardly below the respective shelves.

It will be appreciated that due to the disposition of the shelves 110 adjacent to the rails 112 and 114, that file folders 124 may not be moved upwardly above the rails in order to remove the folders from a position between the superimposed shelves 110. Accordingly, the same manner of operation as hereinbefore described in FIGS. 1 and 3 of the drawings occurs with respect to the species shown in FIGS. 9 to 14 of the drawings. This structure, as shown in FIG. 9, comprises a pair of bars 126 which are functionally similar to the hereinbefore described bars 50 and these bars 126 support a generally V-shaped folder 124 such that files or papers may be inserted between the bars 126 and between the opposite sides 126 and 128 of the folders 124.

A pair of the bars 126 is thus used to support the generally V-shaped folder 124, and these bars 126, as shown in FIGS. 11 and 12 of the drawings, may readily be operable in a manner with respect to the rails 112 and 114 such as hereinbefore described, relative to the bar 50 and the respective rail portions 34 and 36.

Each bar 126 is provided with a pair of notches 130 and 132 which are similar to the notches 54 and 56, hereinbefore described, relative to the structure described in FIGS. 1 to 3 of the drawings.

Figure 14:
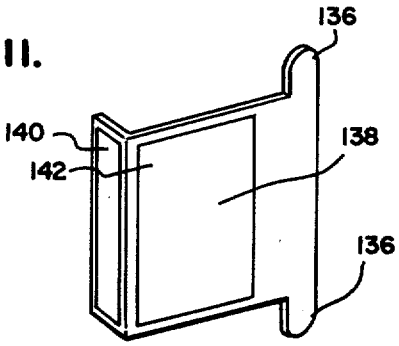
FIG. 14 is a perspective view showing on enlarged scale the details of a file identifying tab structure which is provided with opposed projections adapted to interlock with openings in the edge of a respective folder.

Outer marginal edges of the sides 126 and 128 are provided with tab supported openings 134, and these openings are arranged in straight rows and spaced apart equally so as to receive projections 136 at opposite ends of an identification tab 138, shown in detail in FIG. 14 of the drawings.

It will be obvious that the projections 136 may be deflected and sprung into a pair of respective openings 134, and that the tabs may be thus vertically located in various positions so that tabs 138 of an adjacent folder 124 will not overlap or obscure each other in adjacent relationship. The tabs 138 are each provided with two designation areas 140 and 142, as shown in FIG. 14 of the drawings, however, various labels and/or indicia may be carried by the tabs 138, as desired, for identifying subject matter in the respective folders 124.

In the operation of the species of the invention as shown in FIGS. 9 to 14 of the drawings, the removal of the bars 126, together with a respective folder 124, is accomplished in accordance with the disclosure of FIGS. 11 and 12 which corresponds with the mode of operation described in FIGS. 2 and 3 of the drawings, and thus the bars 126 and respective folders 124 are capable of being removed from the rails 112 and 114 directly below a respective shelf 110 which prevents the folders 124 from being removed upwardly above the rails 112 and 114. Accordingly, this combination of elements affords means for providing a very efficient open shelf filing system of very compact high capacity, and which also provides for the slidable suspension of the folders between the shelves. Accordingly, the manner in which the bars 126 and the folders 124 are removed from the rails 112 and 113 in their close proximity to the superimposed shelves 110, affords a combination of elements which is particularly advantageous for use in the open shelf filing system wherein files such as legal size files or the like may be disposed and stored.

Figure 15:
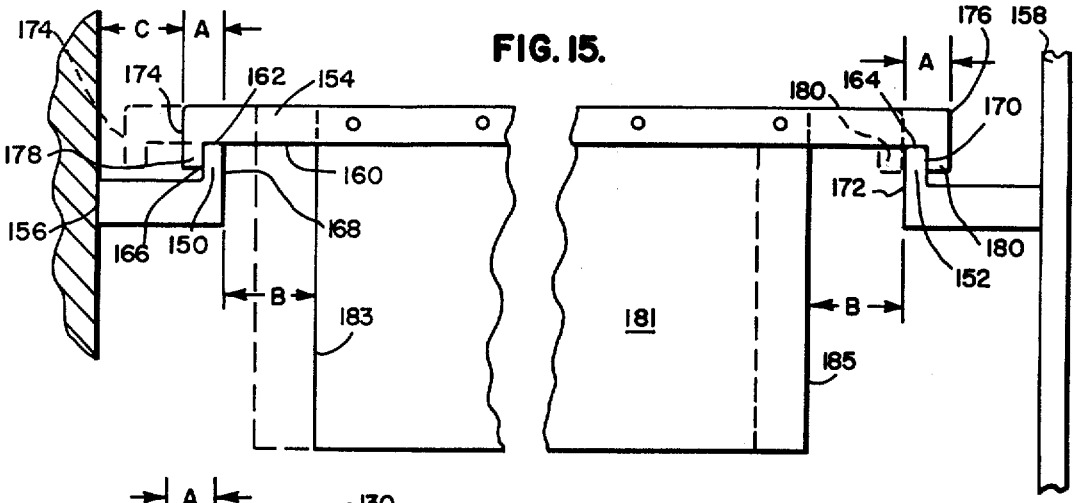
FIG. 15 is a diagrammatic view of a modification of the invention.

As shown in FIG. 15 of the drawings, a pair of rails 150 and 152 support a bar 154 and the rails 150 and 152 are carried by rail support means 156 which may comprise a wall and/or a suitable frame, as desired. The rail 152 may be supported by one or more vertical frame members 158 as shown in FIG. 17.

Each document supporting bar is provided with a normally lower edge 160 adapted to bear upon upper edges 162 and 164 of the rails 150 and 152. The rail 150 is provided with an outer side 166 and an inner side 168 while the rail 152 is provided with an outer side 170 and an inner side 172. The inner sides 168 and 172 face each other, all as shown in FIG. 15 of the drawings. Opposite ends 174 and 176 of the bar 154 are provided with downwardly extending stop portions 178 and 180, respectively, which are engageable with the outer sides 166 and 170 of the rails 150 and 152, to limit longitudinal movement of the bar 154 in a direction laterally of the longitudinal direction of the elongated rails 150 and 152, all as shown best in FIGS. 15 and 17 of the drawings. As shown in FIG. 15 of the drawings, the length of each stop portion 178 and 180 is disposed in a direction longitudinally of the respective bar 154, and this length of the stop portion 178, combined with the width of the rail, as for example, the rail 150 from its outer side 166 to its inner side 168, equals a distance A. Thus, the combined length of the stop portion 178 and the width of the rail 150 equals the dimension A as shown in FIG. 15 of the drawings, and the lower edge 160 of the rail 154 adjacent the respective inner sides 168 and 172 of the rails 150 and 152 equals a dimension B, this lower portion 160 being unobstructed for the distance B extending away from the inner side of each of the respective rails, and the distance B being at least equal to or greater than the distance A so that the bar 154, when in the broken line position as shown in FIG. 15, has its stop portion 180 in position to clear the inner side 172 of the rail 152 while the end 174 of the bar 154 is extended to a position wherein it is substantially spaced from the outer side of the rail 166 and the rail support means, namely, the wall 156 is spaced from the outer side of the rail 166 a sufficient distance to allow unobstructed movement of the end 174 of the bar to the broken line position shown in FIG. 15, to allow the opposite end 176 to clear the inner side of the rail 152. Additionally, it will be seen that a document support 181 or a document is provided with opposite edges 183 and 185 which are spaced a distance B equal to the unobstructed distance of the lower edge 160 of the bar 154, and these edges 183 and 185 are normally spaced this distance away from the respective inner sides of the rails 150 and 152 when the respective stop portions 178 and 180 are closely adjacent to the respective outer sides 166 and 170 of the rails 150 and 152. Thus the assembly of the bar 154 and the document holding means 181 provides an unobstructed relationship relative to the inner sides of the rails so that the bar 154 carrying the document holding means may be moved longitudinally of the bars and laterally of the rails a sufficient distance to allow one outer end of each bar to clear a respective inner side of a respective rail so that the removal procedure of the bar and the respective document holding means may be carried out, as herenbefore described, in connection with FIG. 11 of the drawings.

Figure 16:
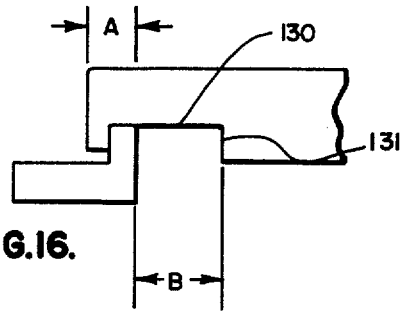
FIG. 16 is another diagrammatic view showing fragmentary structure similar to that disclosed in FIGS. 11 and 12 of the drawings.

With reference to FIG. 16, it will be obvious that the notch 130 in the bar 126, as shown in FIG. 11, comprises an unobstructed area equal to the dimension B so as to provide clearance relative to the inner side of the respective rail, as hereinbefore described in FIG. 15 of the drawings. Accordingly, the clearence of an end 131 of the notch 130 is generic to the clearance described in connection with FIG. 15, whether it relates to the end of the notch or the edge of a document or a document holding means.

Figure 10:
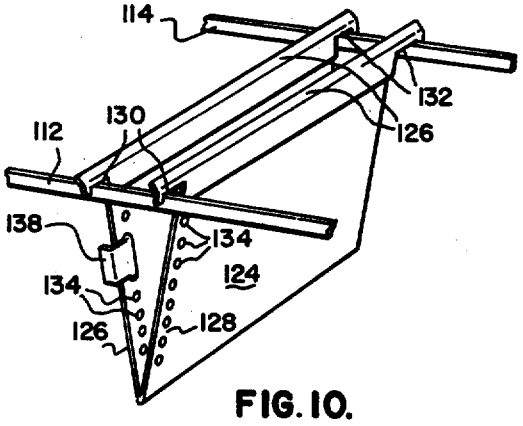
Figure 17:
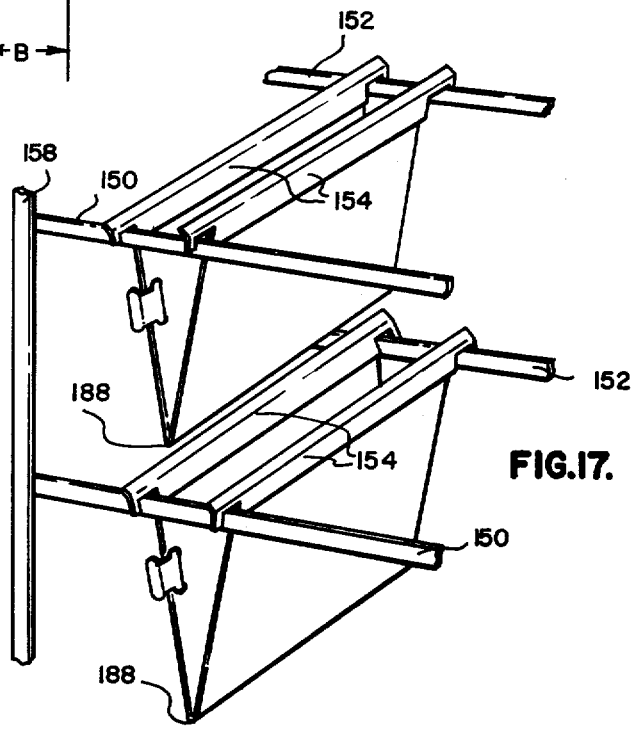
FIG. 17 is a view of structure similar to FIG. 10 but showing superimposed pairs of rails supporting document carrying bars such that the superimposed rails allow removal of the bars from the rails and below respective pairs thereof without causing interference of the lower extremities of the document holding means with the respective pair of rails therebelow.

In the modification as shown in FIG. 17, the bars 154 are in pairs and hold generally V-shaped document holding means similar to that described in connection with FIG. 10 of the drawings, and the rails 150 and 152 are in pairs, there being two superimposed pairs shown, each document holding means having a lower extremity 188 which is spaced sustantially above the next lowermost pair of rails 150 and 152 to allow clearance of said lower extremity 188 as the bars 154 are disengaged from the rails 150 and 152 and moved outwardly therebelow in a manner as hereinbefore described in connection with FIG. 11 of the drawings. It will be thus understood that the removal of the bars 154, shown in FIG. 15, may be accomplished in a manner similar to that described in FIG. 11 of the drawings.

It will be obvious to those skilled in the art that various modifications of the invention maybe resorted to without departing from the spirit of the invention.

We claim:

1. Document filing apparatus, comprising:

a frame including rail support means and first and second elongated substantially horizontally-disposed rails each being of equal width and each having opposite inner and outer sides, said first and second rails being disposed in horizontal spaced-apart relationship with said inner sides of said rails facing each other; and a plurality of elongated document-supporting bars each having a load carrying upper portion and a document carrying lower portion, each said upper portion extending the full length of said bar and being generally concavo-convex in cross section to provide supporting strength for said bar and to provide a relatively compact horizontal nesting relationship with other like bars positioned adjacent to each other, said lower portion being generally planar in configuration with an upper boundary thereof affixed to a lower boundary of said upper portion, *each of* said [lower portion] *bars* having first and second notches formed therein proximate the ends of said bar, said notches opening downwardly away from said upper portion for receiving respective ones of said rails when said bar is positioned thereupon, that part of said lower portion extending between said first and second notches including a plurality of fastening means each comprised of an integral flexible fastener and opening means for affixing documents to said supporting bar, [the end-most parts of said lower portion forming stops] *first and second downwardly extending stop portions on the respective ends of the bar, said stop portions being* of equal length extending in a direction longitudinal of said bar, said first and second notches each having a longitudinal length greater than the combined widths of said first and second rails and the length of one of said

[stops] *stop portions* such that when said first end of said bar is raised, said bar may be moved in said longitudinal direction toward said second rail far enough that said one end may be lowered to clear said inner side of said first rail while said second notch is still engaged with said second rail, thus allowing said second notch to thereafter be disengaged from said second rail by longitudinal movement of said bar beneath said first rail and in a direction away from said second rail while said bar is tilted to an inclined position and said second end of said bar is raised slightly to clear said second rail wherein said flexible fastener and opening means includes an elongated strap having an enlarged head segment at one end *severed from said lower portion,* the other end of said strap remaining unsevered from said lower portion, the severed strap and head segment leaving a generally key-shaped opening in said lower portion whereby when said strap is used to form a loop for affixing documents to said supporting bar, said head segment may be locked within said opening by slipping said head segment through that part of the opening formerly occupied by the elongated portion of the strap.

2. Document filing apparatus as recited in claim 1 wherein each said supporting bar further includes a reinforcing member having a concavo-convex cross section for mating with said upper portion and wherein said upper portion includes upper and lower channel portions for receiving the upper and lower edges of said reinforcing member.

3. A document supporting bar for use in hanging documents upon a pair of spaced-apart rails, comprising:

an elongated load-carrying upper portion having a generally concavo-convex transverse cross section; and a generally planar lower portion [including a rectangular central segment and a pair of generally L-shaped end segments, said central segment] including an upper boundary [at which said central segment is] secured to *a lower boundary of a central segment of* said upper portion, and a pair of end boundaries, said [central segment] *lower portion* further including a plurality of fastening means each comprised of an integral flexible fastener and opening means for affixing said documents to said supporting bar, [said L-shaped segments including a first boundary aligned with an end of said upper portion, a second boundary at which said L-shaped segment is secured to said upper portion, a third boundary coincident with one of said end boundaries, a fourth boundary forming a rail-engaging surface, and a fifth boundary forming a stop and cooperating with said fourth boundary and the adjacent one of said end boundaries to form a rail-receiving notch] *a pair of stop portions extending downward from the respective opposite ends of the upper portion, said stop portions and said end boundaries of the lower portion defining a pair of rail receiving notches proximate the ends of the bar* wherein said flexible fastener and opening means includes an elongated strap having an enlarged head segment at one end *severed from said lower portion,* the other end of said strap remaining unsevered from said lower portion, the severed strap and head segment leaving a generally key-shaped opening in said lower portion whereby when said strap is used to form a loop for affixing documents to said supporting bar, said head segment may be locked within said opening by slipping said head segment through the part of the opening formerly occupied by the elongated portion of the strap.

4. A document supporting bar as recited in claim 3 wherein said upper portion is relatively rigid and said lower portion is relatively flexible.

5. A document supporting bar as recited in claim 3 and further including an elongated reinforcing member having a concavo-convex cross section for mating with said upper portion, and wherein said upper portion includes upper and lower channel portions for receiving the upper and lower edges of said reinforcing member.

*6. A document supporting arrangement for use in hanging documents upon a pair of horizontally spaced-apart rails, comprising:*

*an elongated strip-like supporting bar having an upper load carrying portion with ends adapted to be supported by the rails,*

*said strip-like supporting bar having its width extending vertically,*

*said strip-like bar having a lower document supporting portion with a plurality of spaced openings intermediate the ends of the bar,*

*a plurality of spaced flexible straps corresponding to the spaced openings,*

*said flexible straps exending through the respective openings at one ends thereof,*

*said flexible straps having head portions on the one ends thereof,*

*each of said head portions having a pair of oppositely directed abutments for interlocking with the document supporting portion on opposite sides of the openings to secure the one ends of the straps,*

*means securing the other ends of the straps and supporting the documents on the straps so that the documents are carried by the straps on the document supporting portion, and*

*said openings having a shape permitting insertion and withdrawal of the head portions of the straps.*

*7. A document supporting arrangement as claimed in claim 6 wherein said straps are elongated, and the other ends of the straps are integral with the supporting bar.*

*8. A document supporting bar for use in hanging documents upon a pair of spaced-apart rails, comprising:*

*a horizontally elongated load carrying upper strip-like structure, the width of said upper strip-like structure extending vertically,*

*said upper strip-like structure having a length for extending at opposite ends thereof over the rails to be supported thereby,*

*said upper strip-like structure further having a vertical cross section formed concavo-convex throughout the length of the upper strip-like structure,*

*the concave and convex sides of said concavo-convex cross section being formed to mate with respective convex and concave sides of adjacent supporting bars whereby a plurality of supporting bars can be nested together on the rails,*

*a generally vertical planar lower portion integral with the upper strip-like structure and extending downward therefrom,*

*said lower portion having a dimension parallel to the length of the upper strip-like structure less than the space between the rails so as to extend downward therebetween, and*

*said lower portion including means for attaching a document to the supporting bar.*

*9. A document supporting arrangement including the document supporting bar as claimed in claim 8 wherein said means for attaching a document includes a plurality of spaced openings formed in the lower portion, said supporting arrangement further including a plurality of flexible straps adapted to support the documents wherein said straps have head portions on one ends thereof for interlocking with the openings in the lower portion and have means at the other ends thereof for securing the straps so that the documents are carried by the straps on the lower portion, and said openings having a shape permitting insertion and withdrawal of the head portions of the straps.*

*10. A document supporting bar for use in supporting documents upon first and second spaced rails, comprising:*

*an elongated load-carrying upper structure having first and second ends,*

*a generally planar lower document supporting portion integrally joined at its upper boundary with the lower boundary of a central segment of the upper structure,*

*first and second stop portions extending downward from the upper structure at the respective first and second ends of the upper structure,*

*said lower document supporting portion having first and second ends which with the respective first and second stop portions define respective first and second notches in the bottom of the supporting bar for receiving the respective first and second rails with the stop portions extending on outer sides of the rails,*

*said second notch having a dimension extending longitudinally along the bar greater than the combined width of said first and second rails and said first stop, and*

*said second end of the document supporting portion being spaced from the first end of the upper structure by less than the space between the rails such that the first end of the upper structure can be lifted to raise the first stop above the rail and the supporting bar can be slid on the second rail entirely within the second notch until the first end of the upper structure and the first stop portion are free to move downward inside of the first rail.*

*11. A document supporting bar as claimed in claim 10 wherein said upper structure is strip-like, the width of the strip-like upper structure extends vertically, said strip-like structure has a vertical cross section formed concavo-convex throughout the length of the upper strip-like structure, and the concave and convex sides of said concavo-convex cross section are formed to mate with respective convex and concave sides of adjacent supporting bars whereby a plurality of supporting bars can be nested together on the rails.*

*12. A document supporting arrangement including the document supporting bar as claimed in claim 10 wherein said lower document supporting portion includes a plurality of openings spaced therein, and said supporting arrangement further includes a plurality of flexible straps adapted to support the documents, said straps having head portions on one ends thereof for interlocking with the openings in the lower document supporting portion and having means at the other ends thereof for securing the straps so that the documents are carried by the straps on the lower document supporting portion, and said openings having a shape permitting insertion and withdrawal of the head portions of the straps.*

*13. A document supporting arrangement as claimed in claim 12 wherein said upper structure is strip-like, the width of the strip-like upper structure extends vertically, said strip-like upper structure has a vertical cross section formed concavo-convex throughout the length of the strip-like upper structure, and the concave and convex sides of said concavo-convex cross section are formed to mate with respective convex and concave sides of adjacent supporting bars whereby a plurality of supporting bars can be nested together on the rails.*

* * * * *